Figure 3:
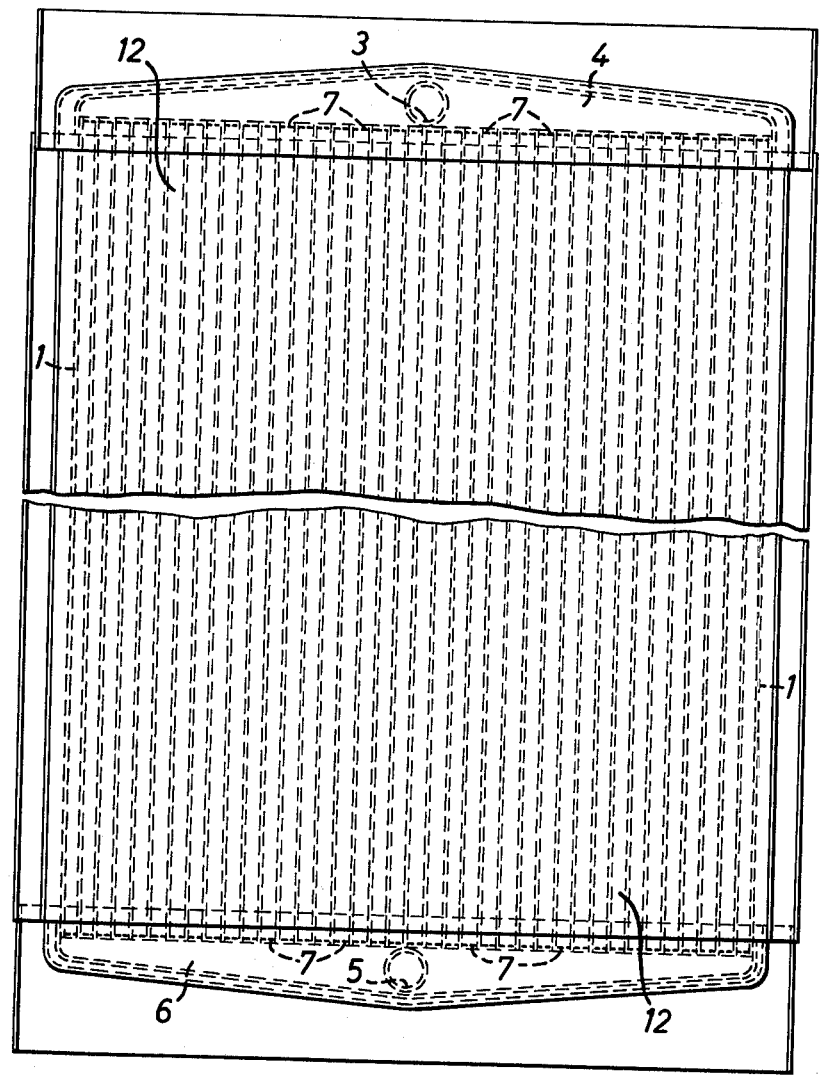

United States Patent [19]

Harvey

[11] 4,082,082
[45] Apr. 4, 1978

[54] SOLAR ENERGY COLLECTOR

[75] Inventor: Lawrence Harvey, Coldharbour, near Dorking, England

[73] Assignee: The British Petroleum Company Limited, London, England

[21] Appl. No.: 712,278

[22] Filed: Aug. 6, 1976

[30] Foreign Application Priority Data

Aug. 19, 1975 United Kingdom .............. 34398/75

[51] Int. Cl.² .............................................. F24J 3/02
[52] U.S. Cl. ..................................... 126/271; 126/270
[58] Field of Search ............... 126/270, 271; 237/1 A; 165/170, 171, 168

[56] References Cited

U.S. PATENT DOCUMENTS

| 3,102,532 | 9/1963 | Shoemaker | 126/270 |
| 3,859,980 | 1/1975 | Crawford | 126/271 |
| 3,934,323 | 1/1976 | Ford et al. | 126/271 |
| 3,981,294 | 9/1976 | Deminet et al. | 126/271 |

Primary Examiner—Kenneth W. Sprague
Assistant Examiner—James C. Yeung
Attorney, Agent, or Firm—Brooks, Haidt, Haffner & Delahunty

[57] ABSTRACT

Solar energy collector having a heat collecting zone which comprises an integrally formed strip of parallel transparent tubes which contains an energy absorbent particulate or fibrous material. The strip is preferably made by an extrusion process using polysulphone or polycarbonate resin.

6 Claims, 3 Drawing Figures

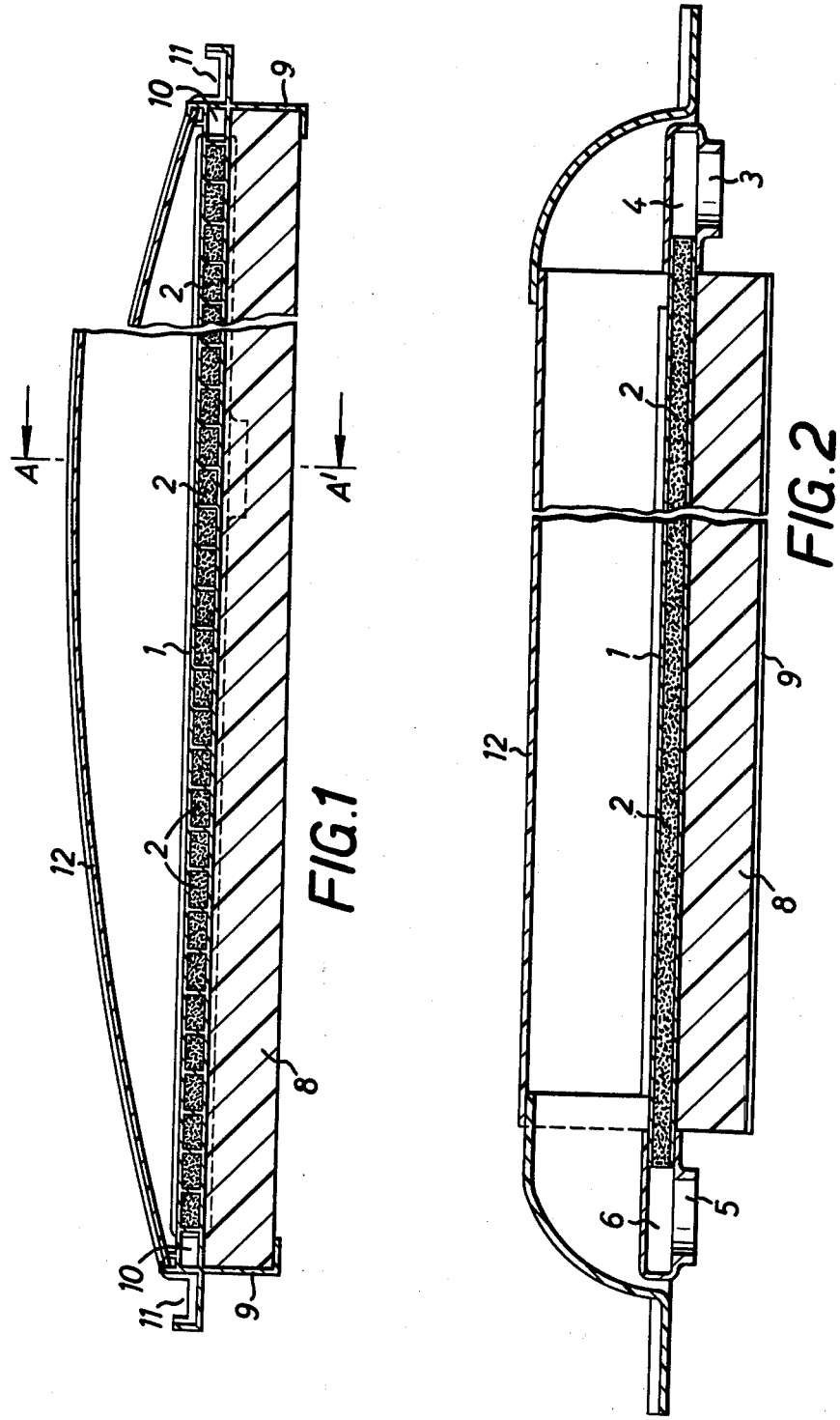

SOLAR ENERGY COLLECTOR

The present invention relates to solar energy collectors.

Solar collectors for thermal conversion fall into two main categories:

1. Collectors for high temperature conversion, the sun's rays being concentrated by concave reflectors which track the sun during the day. This type of collector cannot be used effectively in diffuse light.

2. The fixed "flat-plate" collectors which will convert direct or diffuse sunlight into heat, for temperatures below 200° C.

Typically a "flat-plate" collector of a type which has been used successfully in countries such as Israel and Japan comprises a circular metal tube bonded to a metal plate which is mounted on an insulated surface. Heat absorbed by the plate passes into the heat collecting fluid that is arranged to pass through the metal tubing. To improve efficiency the collector is normally placed in a sealed box having a transparent cover which suitably is made with double glazing. Such units can have an efficiency of about 40% at 50° C.

For this type of collector to be of use in high latitudes, where the angle of incidence of the solar radiation is lower, particularly during winter months, the conversion efficiency has to be much improved.

Copending British application 45835/74 (BP Case No. EG 3840) discloses a solar collector comprising a transparent heat collecting zone and energy absorbent particles or fibres having a density not greater than 1.1 present in said zone.

An object of the present invention is to provide an improved solar energy collector.

Accordingly the present invention provides a solar energy collector comprising a heat collecting zone comprising an integrally formed strip of parallel transparent tubes and an energy absorbent particulate or fibrous material in said tubes.

The transparent tubes are suitably made from any transparent material capable of being fabricated to give the integrally formed strip. The transparent material employed is preferably transparent to as large a proportion of the solar spectrum, including infra-red, visible and ultra-violet radiation as possible and should not soften at temperatures likely to be encountered in the operation of the collector. Suitable transparent materials include glass, polymethyl methacrylate, cellulose acetate, polyethylene, polystyrene, polycarbonate, clear P.V.C. and mica. Plastics material such as P.V.C., polysulphone and polycarbonate are especially suitable, as they have low thermal conductivity. The use of polysulphone is preferred.

The strip of tubes is preferably formed as a single layer of tubes lying adjacent to one another wherein the longitudinal axes of the tubes are coplanar.

The tubes can have any desired cross-sectional shape, for example circular, elliptical, square, rectangular or polyhedral. In a preferred solar energy collector according to the invention the tubes have a square or rectangular cross-section, two opposite sides of each tube forming top and bottom surfaces of the strip and each of the other opposite sides forming a common side with an adjacent tube except at the longitudinal edge of the strip where the edge tubes have only one side common with an adjacent tube.

The tubes are connected together at either end by suitable manifold pieces in which are positioned the inlet and outlet pipes.

The strip of transparent tubes is preferably fabricated by extrusion or blow moulding.

In a particularly preferred embodiment of the invention the integrally formed strip of parallel transparent tubes is fabricated with an outer layer of transparent thermoplastic and an inner layer of another transparent material co-extruded therewith or coated thereon and being relatively impermeable to water. Thus the parallel transparent tubes may be fabricated with an outer layer of polycarbonate resin, and an inner layer, coated thereon, of polyvinyl chloride, polyvinylidene fluoride, polyvinylidene chloride, clear acrylonitrile/butadiene/styrene resin, clear high density polyethylene, or methyl methacrylate/butadiene/styrene, isobutylene, polyvinyl acetate, elastomers such as silicone rubber or inorganic coatings such as quartz coatings in a resin binder, e.g. Degussa quartz coatings. Alternatively the tubes may be fabricated with an outer layer of polycarbonate resin and an inner layer co-extruded therewith of another plastic material relatively impermeable to water.

The energy absorbent particulate or fibrous material contained in the heat collecting zone of the present invention is suitable made from any material capable of effectively absorbing solar radiation. The density of the particles or fibres is preferably not greater than 1.1, and most preferably is in the range 0.9 to 1.0. Preferred materials from which the particles of fibres are made are carbon, for example carbon or graphite pellets or carbon fibres; carbon filled plastics or rubber, for example carbon filled polyethylene pellets or fibre or granulated scrap motor car tyres; blackened expanded perlite particles; bitumen or modified bitumen chippings; chemically blackened metal wood or metal particles; and black glass particles or dark flint chippings. Materials having high solar energy absorption and low thermal diffusivity (e.g. preferably below $2.5 \times 10^{-3}$ cms$^2$/sec at temperatures above 20° C), for example carbon filled high density polyethylene, are particularly preferred.

Where the energy absorbent material is particulate the particles can be for example discrete granules, pellets, beads tubelets or chippings, or a porous sintered mass of the particles. Cylindrical hollow pellets or tubelets are preferred. The particles preferably have a mean particle diameter in the range 1 to 10 millimetres, most preferably 3.0 to 4.0 mm. The particles preferably substantially fill the heat collecting zone but are loosely packed so that when a liquid is passed through they are not entirely static but are free to move to a limited extent within the confines of the heat collecting zone. The energy absorbent particulate or fibrous material is confined to the heat collecting zone by an outlet through which the heat conveying fluid, but not the particulate or fibrous material, can pass, for example a gauze strip.

The strip of parallel tubes is preferably heat insulated on one side (i.e. the opposite side to that which will receive solar radiation) to minimise heat losses from that side. This can be achieved for example by making the rear surface of the collector reflective and/or using conventional insulating materials. Heat losses from the side adapted to receive solar radiation can be reduced if desired by covering with one or more layers of transparent material.

In use, the solar energy collector is placed where it can receive direct solar radiation and a suitable heat conveying fluid is passed through the tubes. Solar radiation falling on the energy absorbent material is converted to thermal energy which heats up the heat conveying fluid. The heated fluid may be utilised directly or passed through a heat exchanger or into storage. It is preferred that the tubes are packed in such a way that the fibres or granules and the fluid intermingle in the interstices giving maximum heat transfer to the fluid. The fibres or granules are preferably free to oscillate or vibrate with the fluid flow.

The heat conveying fluid must be wholly or partially transparent to solar energy and can be a liquid or a gas, examples of suitable fluids being water, water/antifreeze mixtures, alcohols such as glycerine, oil, air, carbon dioxide, or high aliphatic hydrocarbons. Good results are obtained using water as the heat conveying fluid. The heat conveying fluid should be chosen to be compatible with the material of construction of the solar energy collector. Thus methanol would not be suitable for use in a collector constructed from polycarbonate.

The invention is further illustrated by reference to the specific embodiment shown in FIGS. 1 to 3 of the accompanying drawings.

FIG. 1 represents a vertical cross-section through a solar energy collector according to the invention, FIG. 2 represents a vertical cross-section through the line A—A' in FIG. 1, and FIG. 3 represents a plan of the solar energy collector shown in FIG. 1.

The solar collector comprises an integrally formed strip 1 extruded from a transparent thermoplastic and comprising a number of parallel tubes each having a rectangular cross-section. The tubes are packed with fibrous carbon black filled high density polyethylene 2. At one end of the strip 1 is an inlet pipe 3 connected to an inlet manifold 4 and at the other end there is a similar outlet pipe 5 and manifold 6. The fibrous material is prevented from entering the manifolds by perforated strips 7. A layer of foamed thermoplastic held in place by the skirt 9 provides insulation for the under surface of the solar collector. On either side of the strip 1 the outermost rectangular tube 10 provides insulation at the edges and does not form part of the heat collecting zone. At each edge an integrally formed gutter 11 is provided to allow drainage of rain water. A sheet of transparent thermoplastic 12 is present to provide insulation to the side adapted to receive solar radiation. Panels of the type shown in FIGS. 1 to 3 can be laid side by side and linked together at the gutter edges by U-shaped pieces so as to cover part or all of a roof surface.

In use, the solar radiation collector is situated in a position preferably where it will receive a maxmum of direct solar radiation and is connected by the inlet and outlet pipes to, for example, a heat exchange in a hot water storge tank, or if water is used as the heat conveying fluid it may be piped-up directly to the tank. The fluid may be circulated, for example, either by arranging the system so that the fluid heated by the solar radiation thermally syphons into the tank or by employing a low power pump. Alternatively, water may be gravity fed to the collector and thence piped to, e.g. a storage tank.

If desired, several solar radiation collectors can be linked together in series and/or in parallel. The collectors can also be manufactured to form interlocking sheets which can be used to cover a roof. The interlocking sheets can be insulated on the side facing the sun by a single sheet of transparent material if desired. Such a system can provide hot water, for example, for domestic use or heating a swimming pool.

I claim:

1. A solar energy collector comprising a heat collecting zone which comprises an integrally formed strip including a plurality of parallel, transparent tubes, said tubes being made from a resin selected from the group consisting of polyvinyl chloride, polysulphone and polycarbonate, inlet means communicating with one end of said tubes and outlet means communicating with the opposite end of said tubes for supplying a heat conveying fluid to, and removing said fluid from, said tubes, an energy absorbing particulate or fibrous material substantially filling said tubes but loosely packed so as to permit said fluid to flow through said tubes, said energy absorbing material having a density in the range from 0.9 to 1.0 and a thermal diffusivity below $2.5 \times 10^{-3}$ cm$^2$/sec. at temperatures above 20° centigrade, and an energy transparent cover over one side of said strip for permitting solar energy to pass through said cover and enter said tubes.

2. A solar energy collector as claimed in claim 1 wherein the strip of tubes is formed as a single layer of tubes lying adjacent to one another and wherein the longitudinal axes of the tubes are coplanar.

3. A solar energy collector as claimed in claim 1 wherein the tubes are of square or rectangular cross-section.

4. A solar energy collector as claimed in claim 1 wherein the strip of transparent tubes is fabricated by extrusion or blow moulding.

5. A solar energy collector as claimed in claim 1 wherein said tubes are made from extruded polycarbonate and have a co-extruded inner layer of another transparent plastic material relatively impermeable to water.

6. A solar energy collector as claimed in claim 1 further comprising heat insulating means at the side of said strip opposite to said one side thereof.

* * * * *